US011492123B2

(12) United States Patent
Jacob et al.

(10) Patent No.: US 11,492,123 B2
(45) Date of Patent: Nov. 8, 2022

(54) LOW-PROFILE ARMREST ARTICULATION MECHANISM FOR AIRCRAFT PASSENGER SEAT

(71) Applicant: B/E Aerospace, Inc., Winston-Salem, NC (US)

(72) Inventors: Twinkle V. Jacob, Winston-Salem, NC (US); Catalin Bunea, Miramar, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/161,947

(22) Filed: Jan. 29, 2021

(65) Prior Publication Data

US 2022/0242574 A1 Aug. 4, 2022

(51) Int. Cl.
 *B64D 11/06* (2006.01)
(52) U.S. Cl.
 CPC ........ *B64D 11/0644* (2014.12); *B64D 11/064* (2014.12); *B64D 11/0641* (2014.12)
(58) Field of Classification Search
 CPC .............. B64D 11/0644; B64D 11/064; B64D 11/0641
 See application file for complete search history.

(56) References Cited

U.S. PATENT DOCUMENTS

| 6,692,069 | B2 | 2/2004 | Beroth et al. |
| 7,517,010 | B2 | 4/2009 | Saint-Jalmes et al. |
| 8,534,759 | B2 | 9/2013 | Garza et al. |
| 10,717,377 | B2 | 7/2020 | Dry et al. |
| 10,773,613 | B2 | 9/2020 | Nakamura et al. |
| 10,829,018 | B2 | 11/2020 | Burton et al. |
| 10,850,850 | B2 | 12/2020 | Murnan et al. |
| 2003/0080597 | A1* | 5/2003 | Beroth ............... B64D 11/0644 297/423.26 |
| 2003/0085597 | A1 | 5/2003 | Ludeke et al. |
| 2004/0004383 | A1* | 1/2004 | Laurent .............. B64D 11/0641 297/354.13 |
| 2005/0200186 | A1* | 9/2005 | Schumacher ........ B64D 11/064 297/337 |

FOREIGN PATENT DOCUMENTS

EP 1366987 B1 10/2004

OTHER PUBLICATIONS

Extended Search Report in European Application No. 22152435.8 dated May 24, 2022, 8 pages.

* cited by examiner

*Primary Examiner* — Anthony D Barfield
(74) *Attorney, Agent, or Firm* — Suiter Swantz pc llo (57) ABSTRACT

A low profile armrest articulation mechanism for a passenger seat is disclosed. The passenger seat has a seatback reclinable from an upright configuration to a berthed or horizontal configuration (e.g., parallel to the seatpan). The mechanism includes moving stops connecting the armrests on either side to the seatback and linkages connecting the moving stops to the seat frame. As the seatback reclines, the moving stops maintain the armrests at an optimally ergonomic angle (e.g., substantially parallel to the seatpan) for as long as possible. When the seatback reaches the fully reclined or berthed configuration, the armrests may be pivoted upward into a berthed orientation flush with the seatback, adding bed space to the berthed configuration.

10 Claims, 7 Drawing Sheets

LOW-PROFILE ARMREST ARTICULATION MECHANISM FOR AIRCRAFT PASSENGER SEAT

BACKGROUND

Reclining aircraft seats for business-class and other premium class passengers may be configured to recline either partially or fully, effectively converting the seatback and seatpan (and occasionally a leg rest) into a substantially coplanar surface capable of functioning as a bed for the occupying passenger. Such convertible seats may allow the passenger to remain in a partially reclined position, e.g., at one or more intermediate positions between the upright and fully reclined (e.g., berthed) configurations.

However, such passenger seats also include armrests on either side; as the seatback reclines, the armrests may not be in a position to provide suitable ergonomic support either in intermediate positions or in a berthed configuration. While the armrests can be made to conform or articulate, the associated mechanisms add substantial cost and weight while taking up significant amounts of passenger space.

SUMMARY

A passenger seat incorporating a low-profile armrest articulation mechanism is disclosed. In embodiments, the passenger seat includes a seat frame attachable to a passenger cabin floor (e.g., fixed into tracks set into the floor or attached via tracking and/or swiveling components) and a seatpan attached to the seat frame. A seatback is attached to the seat frame and pivots relative thereto; for example, the seatback transitions (e.g., via reclining) between upright and berthed configuration. When in the berthed configuration, the seatback and seatpan collectively serve as a bed for the occupying passenger with a substantially coplanar surface. The passenger seat includes armrests, e.g., on the left and right sides, each armrest attached to the seatback by a pivoting moving stop. The moving stops are attached to the seat frame by rear linkages, the linkages and the moving stops collectively maintaining the armrests at an ergonomically optimal angle to the seatpan as the seatback reclines.

In some embodiments, the ergonomically optimal angle corresponds to maintaining the armrest substantially parallel to the seatpan.

In some embodiments, the moving stops and linkages maintain the armrests at a first ergonomically optimal angle to the seatpan through a first reclining phase or portion and maintain the armrests at a second ergonomically optimal angle to the seatback through a subsequent reclining phase or portion, e.g., once it is no longer feasible for the armrest and the seatpan to remain at the first ergonomically optimal angle.

In some embodiments, the armrests have upper and lower surfaces and are configured to rotate between an upright orientation (e.g., associated with the upright configuration of the seatback) and a berthed orientation associated with the berthed or fully reclined configuration. When in the berthed orientation, the lower surface of the armrest is substantially flush with the seatback, adding to the surface area of the bed.

A pivoting passenger seat incorporating a low-profile armrest articulation mechanism is also disclosed. In embodiments, the passenger seat includes a seat frame attachable to a passenger cabin floor (e.g., fixed into tracks set into the floor or attached via tracking and/or swiveling components). Attached to the seat frame are a seatback and seatpan, the seatpan capable of pivoting relative to the seat frame according to a lateral rotational axis. The seatback is further configured for transitioning between a default or upright configuration and one or more reclined configurations (e.g., wherein the seatback is reclined relative to the seatpan). The armrest articulation mechanism includes moving stops via which the left-side and right-side armrests are connected to the seatback and rear linkages connecting the moving stops to the seatpan. As the seatback transitions (e.g., reclines) from the upright configuration, the moving stops and rear linkages collectively maintain the armrests at an ergonomically optimal angle to the seatpan throughout at least a portion of reclined configurations.

In some embodiments, the ergonomically optimal angle corresponds to maintaining the armrest substantially parallel to the seatpan.

In some embodiments, the rear linkages and moving stops maintain the armrests at the first ergonomically optimal angle to the seatpan throughout a first phase of the transitioning (e.g., a first set of reclined configurations) and maintain the armrests at a second ergonomically optimal angle to the seatback throughout a subsequent phase of the transitioning (e.g., a subsequent set of reclined configurations, wherein it may no longer be feasible for the armrest to remain at the first ergonomically optimal angle to the seatpan).

In some embodiments, the reclined configurations of the seatback include a berthed (e.g., fully reclined, fully deployed) configuration wherein the seatback and the seatpan are substantially coplanar, forming a bed for the occupying passenger.

In some embodiments, the armrests have an upper and a lower surface and are configured for rotation between an upright orientation (e.g., associated with the upright configuration or wherein the upper surface is maintained substantially parallel to the seatpan as the seatback reclines) and a berthed orientation associated with the berthed configuration, wherein the lower surface is substantially parallel with the seatback and adds to the bed surface.

In some embodiments, the seatpan and seatback may collectively pivot through at least a portion of the reclining of the seatback, e.g., the seatpan and seatback may remain at a consistent angle as the seatback reclines.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1:
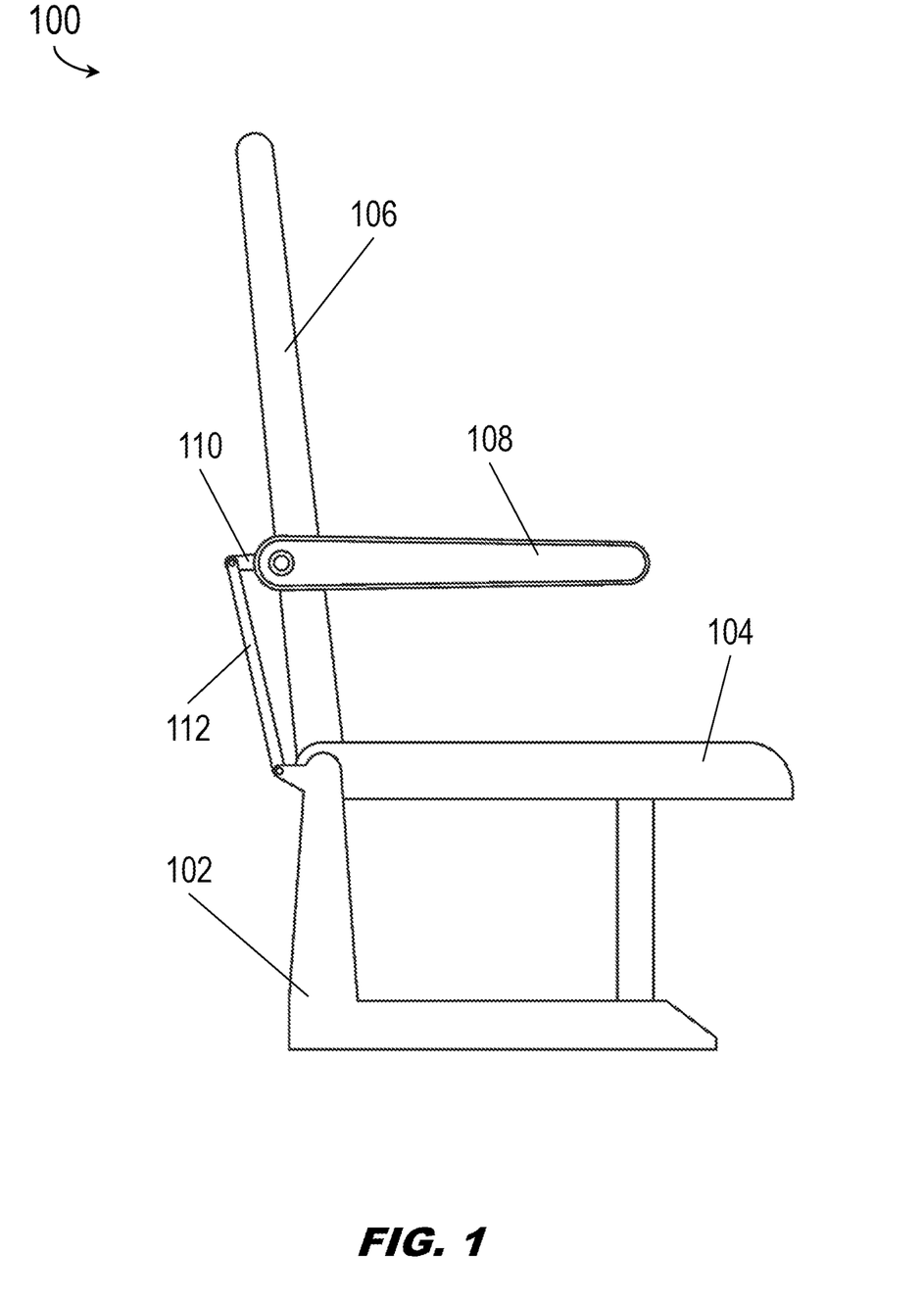
FIG. 1 is a right-side profile view of a passenger seat incorporating a low-profile armrest articulation mechanism according to example embodiments of this disclosure.

Referring to FIG. 1, a passenger seat 100 incorporating a low-profile armrest articulation mechanism is disclosed. The passenger seat 100 may include a seat frame 102, a seatpan 104, a seatback 106, armrests 108 (e.g., left-side and right-side), moving stop 110, and rear linkage 112.

Figure 3:
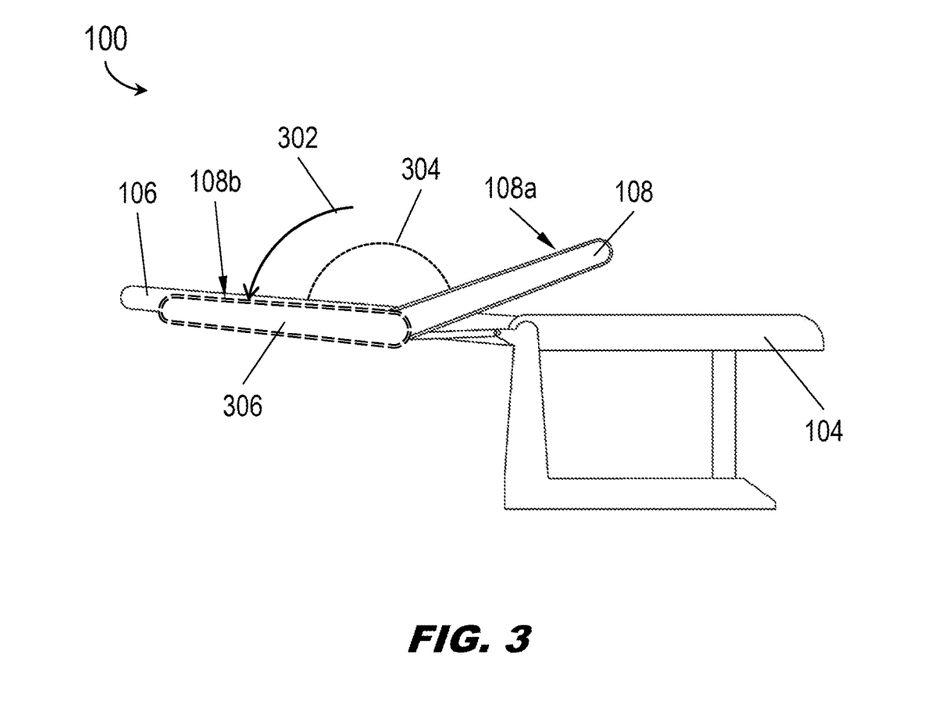
FIG. 3 is a right-side profile view of the passenger seat in a substantially fully reclined configuration.

Broadly speaking, the passenger seat 100 incorporates a low-profile armrest articulation mechanism that maintains, with minimal added weight and complexity, the armrests 108 at an ergonomically optimal angle throughout the reclining process, e.g., from the upright configuration shown by FIG. 1 to a berthed or near horizontal configuration as shown by FIG. 3 below. Once the passenger seat 100 is fully reclined, the passenger may rotate the armrests out of the way so that they are substantially flush with the reclined seatback 106 and able to serve as part of the bed surface.

Figure 2:
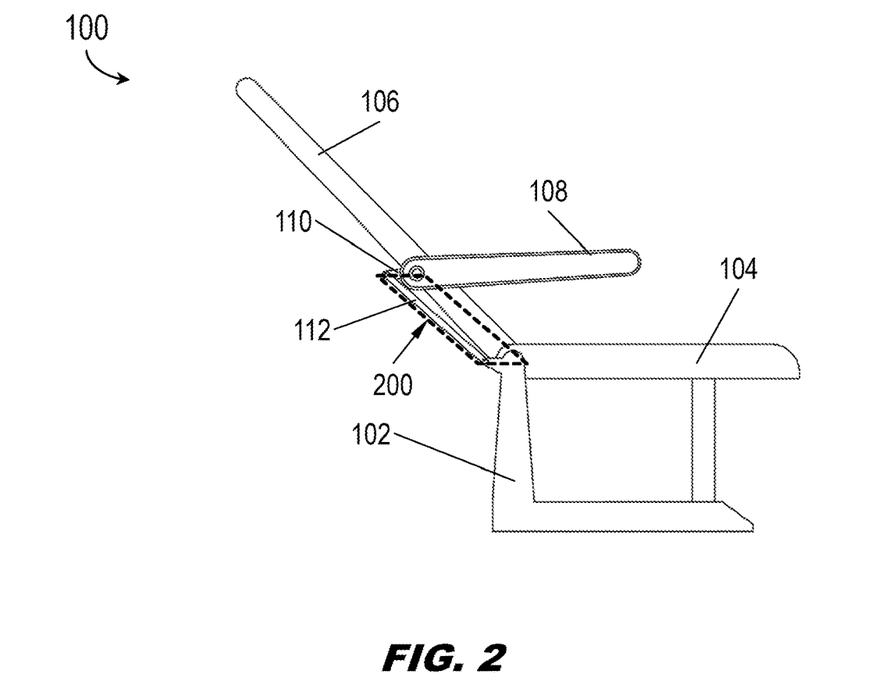
FIG. 2 is a right-side profile view of the passenger seat of FIG. 1 in a reclined configuration.

In embodiments, referring now to FIG. 2, the passenger seat 100 may be transitioned from the upright configuration shown by FIG. 1 to a partially reclined configuration as shown by FIG. 2. For example, the passenger seat 100 may return from the reclined configuration shown by FIG. 2 to the upright configuration shown by FIG. 1, or the passenger seat may be configured to remain in one or more intermediate reclined configurations unless and until articulated further by an occupying passenger. Alternatively, the passenger seat 100 may be spring-loaded or otherwise configured to return unassisted to the upright configuration as a default configuration (e.g., when unoccupied).

In some embodiments, the seat frame 102 may be fixed to the floor of a passenger cabin, e.g., set by track fittings into one or more tracks extending through a passenger cabin. In some embodiments, the seat frame 102 may be attached to the cabin floor (e.g., set into the track fittings) by one or more additional mechanisms allowing the seat frame 102 to translate (e.g., laterally and/or longitudinally) and/or rotate (e.g., swivel) relative to the cabin floor. In either case, the movement of the seatpan 104, seatback 106, and/or armrests 108 relative to the seat frame 102 is unaffected.

In embodiments, as the seatback 106 reclines, the rear linkages 112 and moving stops 110 articulate the armrests 108 such that the armrests remain in an ergonomically optimal position, e.g., at an ergonomically optimal angle to, the seatpan 104 for as long as possible. For example, the rear linkages 112 and moving stops 110 may articulate the armrests 108 as components of a four-bar linkage (200; e.g., in conjunction with the seat frame 102 and the seatback 106). In embodiments, the ergonomically optimal angle may maintain the armrest 108 substantially parallel to the seatpan 104 for as long as possible (e.g., until this angle is no longer feasible).

In some embodiments, the seatpan 104 may be fixed to the seat frame 102 and therefore may remain fixed in place as the seatback 106 reclines. In other embodiments, the seatback 106 and seatpan 104 may additionally pivot collectively, e.g., relative to the seat frame 102 around a lateral rotational axis as shown below by FIGS. 5A and 5B.

Referring to FIG. 3, the passenger seat 100 is shown in a nearly fully reclined (e.g., berthed) configuration wherein the seatback 106 is near-horizontal and nearly coplanar with the seatpan 104.

In embodiments, the reclining seatback 106 may, between the further reclined configuration shown by FIG. 2 and the nearly fully reclined configuration shown by FIG. 3, reach a point where the ergonomically optimal angle of the armrest 108 (in particular, the upper surface 108a of the armrest)

may no longer be perfectly horizontal or parallel to the seatpan 104 (e.g., it may no longer be feasible or possible to maintain this angle between the armrest and seatpan). For example, the moving stops (110, FIG. 1) may allow the armrests 108 to pivot forward relative to the reclining seatback 106 (e.g., and thus remain parallel to the seatpan 104) until obstructed by the moving stops from pivoting forward (e.g., away from the reclining seatback, substantially parallel to the seatpan) any further. This is to allow the armrests 108 to rotate (302) relative to the moving stops. For example, the armrests 108 may rotate (302) upward (e.g., away from the seatpan 104 and toward the seatback 106; in a counterclockwise direction as shown by FIG. 3) at any time to prevent the armrests from blocking entrance into, or egress from, the passenger seat 100 by an occupying passenger.

In embodiments, once the armrests 108 reach the point where they are obstructed from pivoting further, they may remain at an alternative ergonomically optimal angle (304) to the seatback 106 as the seatback continues to recline. Once the seatback 106 is fully reclined, rotating (302) the armrests 108 may place the armrests in a berthed orientation (306) substantially flush or parallel with the seatback (in particular the lower surface 108b of the armrest) such that the lower surfaces of the armrests add space to the seatback in its berthed configuration.

Referring to FIGS. 4A through 4E, the armrest articulation mechanism 400 of the passenger seat 100 is disclosed. The armrest articulation mechanism 400 includes, but may not be limited to, the seat frame 102, seatback 106, armrest 108, moving stop 110, and rear linkage 112 (e.g., a moving stop and rear linkage for each left-side and right-side armrest).

Figure 4A:
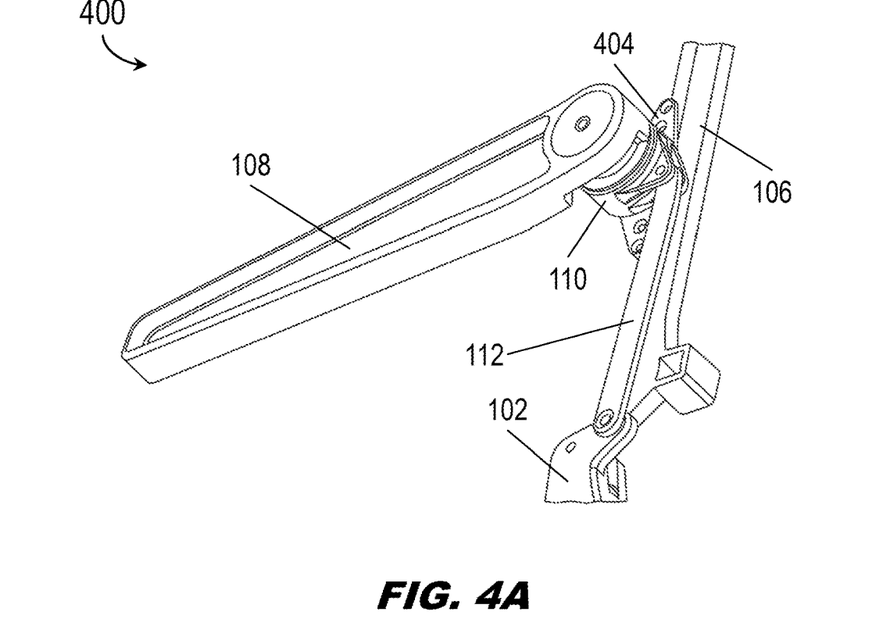
FIG. 4A is an exterior isometric view of the low-profile armrest articulation mechanism of FIG. 1.
Figure 4B:
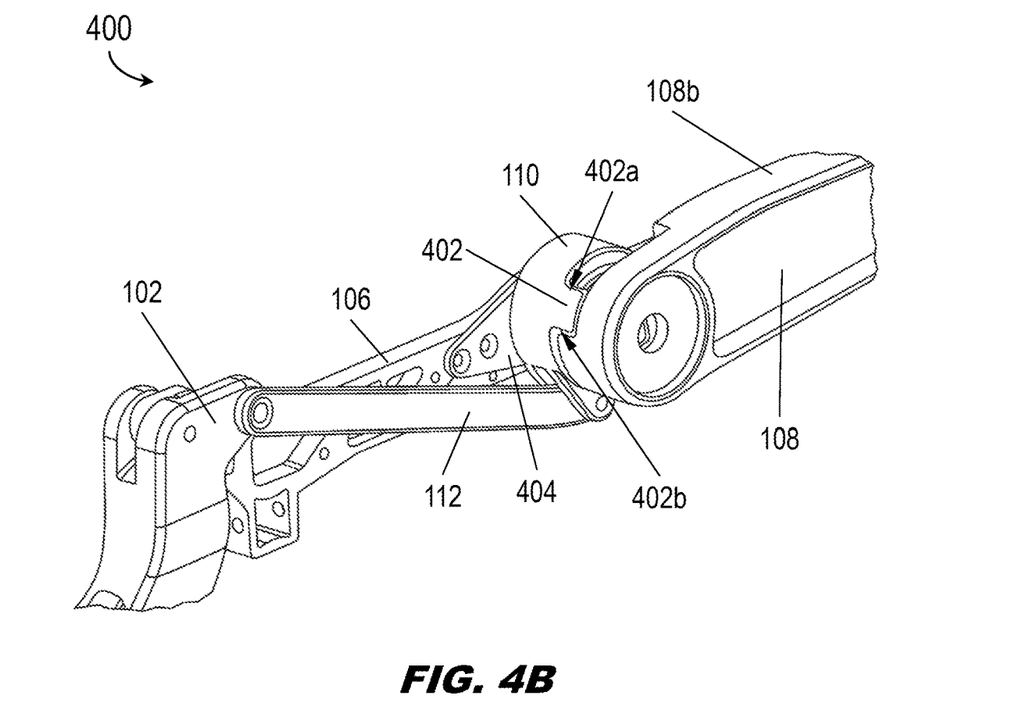
FIG. 4B is an exterior isometric view of the low-profile armrest articulation mechanism of FIG. 1 in a fully rotated configuration.
Figure 4C:
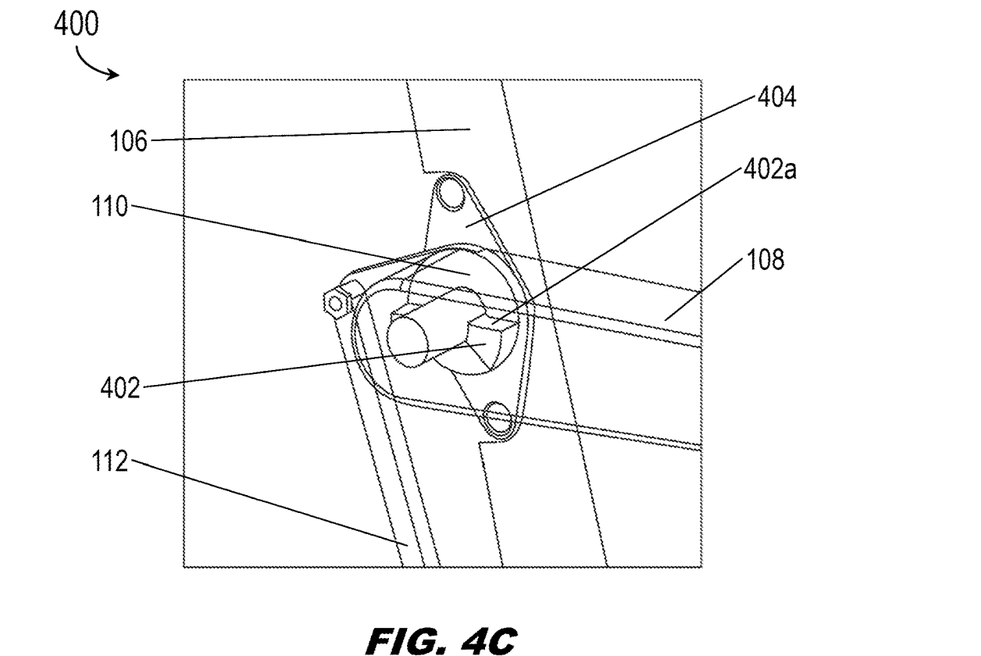
FIGS. 4C and 4D are detailed views of the low-profile armrest articulation mechanism of FIG. 1.
Figure 4D:
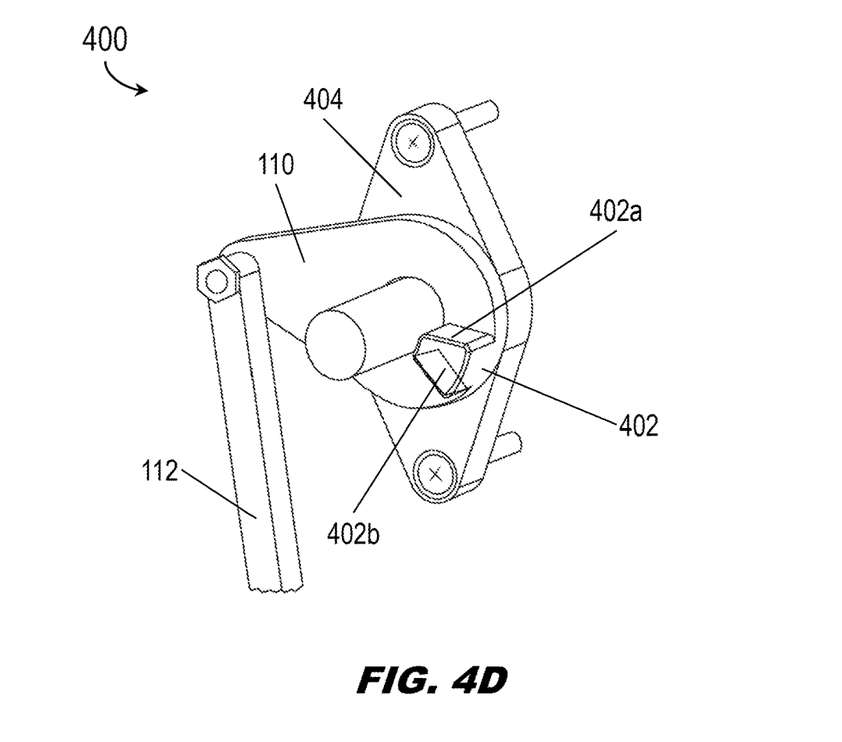
Figure 4E:
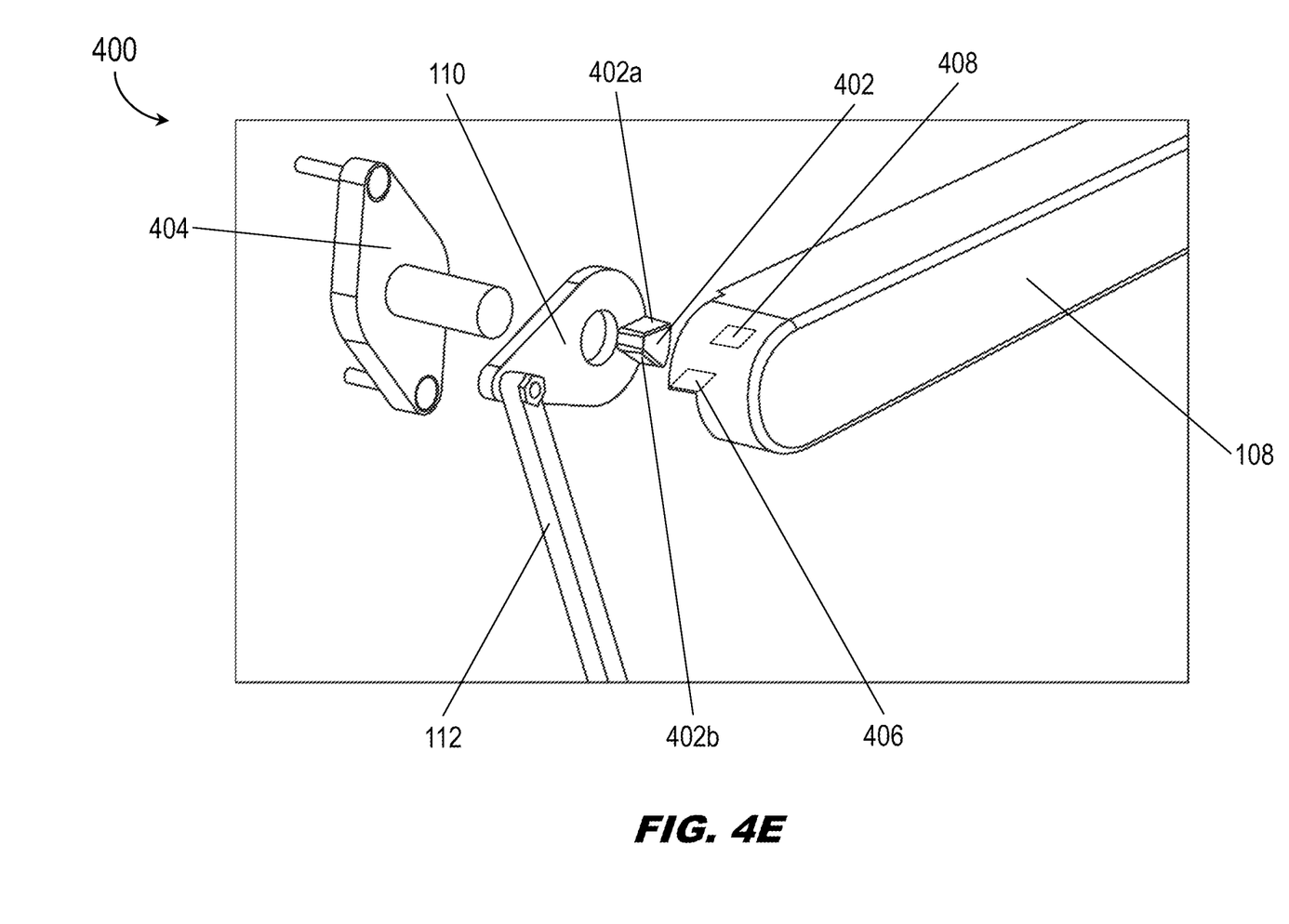
FIG. 4E is an exploded view of the low-profile armrest articulation mechanism of FIG. 1.

In embodiments the armrest 108 may not be directly connected to the four-bar linkage (200, FIG. 2) but may instead freely rotate (302, FIG. 3) relative to the moving stop 110 as described above. For example, the moving stop 110 may include an interior stopping block 402 capable of preventing the armrest 108 from rotating forward past the stopping block (e.g., "forward" as in toward the seatpan (104, FIG. 1) and away from the seatback 106 (e.g., increasing the angle between the armrest and the seatback), but allowing free rotation 302 of the armrest in the opposing direction (e.g., toward the seatback). Referring in particular to FIG. 4B, the stopping block 402 may prevent the armrest 108 from rotating "backward" (302; e.g., toward the seatback 106) past a point where the lower surface 108b of the armrest is substantially coplanar with the seatback 106 (e.g., such that any padding and/or cushioning of the lower surface and the seatback is substantially flush).

In embodiments, referring broadly to FIGS. 4A through 4E, the moving stops 110 may be connected to the seatback 106 via a bracket 404. The moving stops 110 may connect the armrests 108 to either side of the seatback 106, and the rear linkages 112 may connect the moving stops 110 to the seat frame 102. For example, as an occupying passenger reclines the seatback 106 (e.g., toward the berthed configuration shown by FIG. 3), the stopping block 402 (in particular, the upper surface 402a thereof) may serve as a hard stop for the armrests 108 (in particular, the forward interior stop 406 set into the armrest) as the passenger exerts downward force on the armrests (e.g., stabilizing themselves via the hands, forearms, or elbows). imposing a maximum angle (304, FIG. 3) between the armrest and the seatback. Referring in particular to FIG. 4B, when the passenger seat 100 is in a berthed configuration (e.g., as shown by FIG. 3) the opposing surface 402b of the stopping block 402 (e.g., opposite the upper surface 402a) may prevent the armrest 108 (in particular, the rear interior stop 408 set into the armrest) from rotating past a point where the lower surface 108b of the armrest is substantially coplanar with the reclined seatback 106.

Figure 5A:
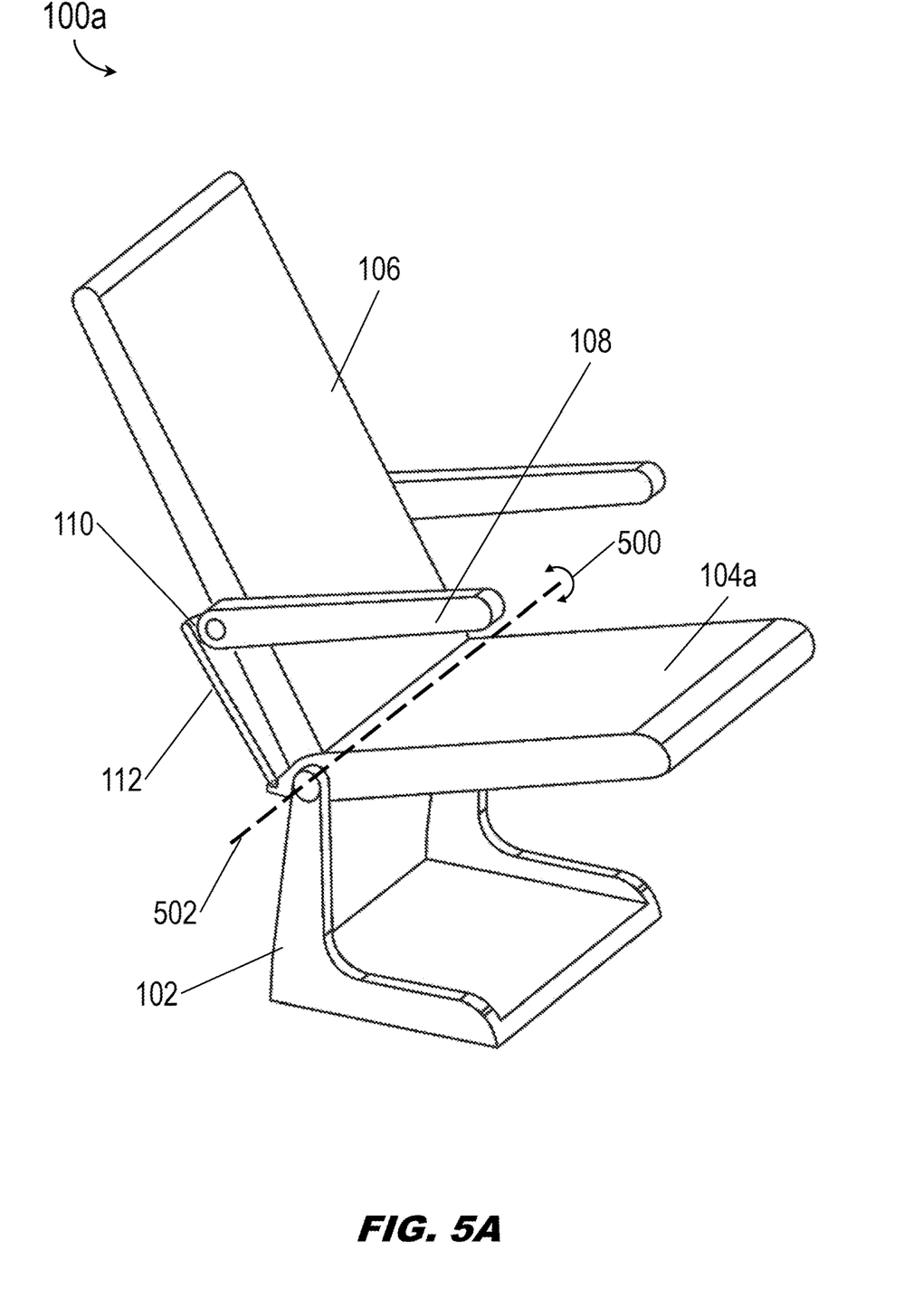
FIG. 5A is a right-side isometric view of a passenger seat incorporating a low-profile armrest articulation mechanism according to example embodiments of this disclosure.
Figure 5B:
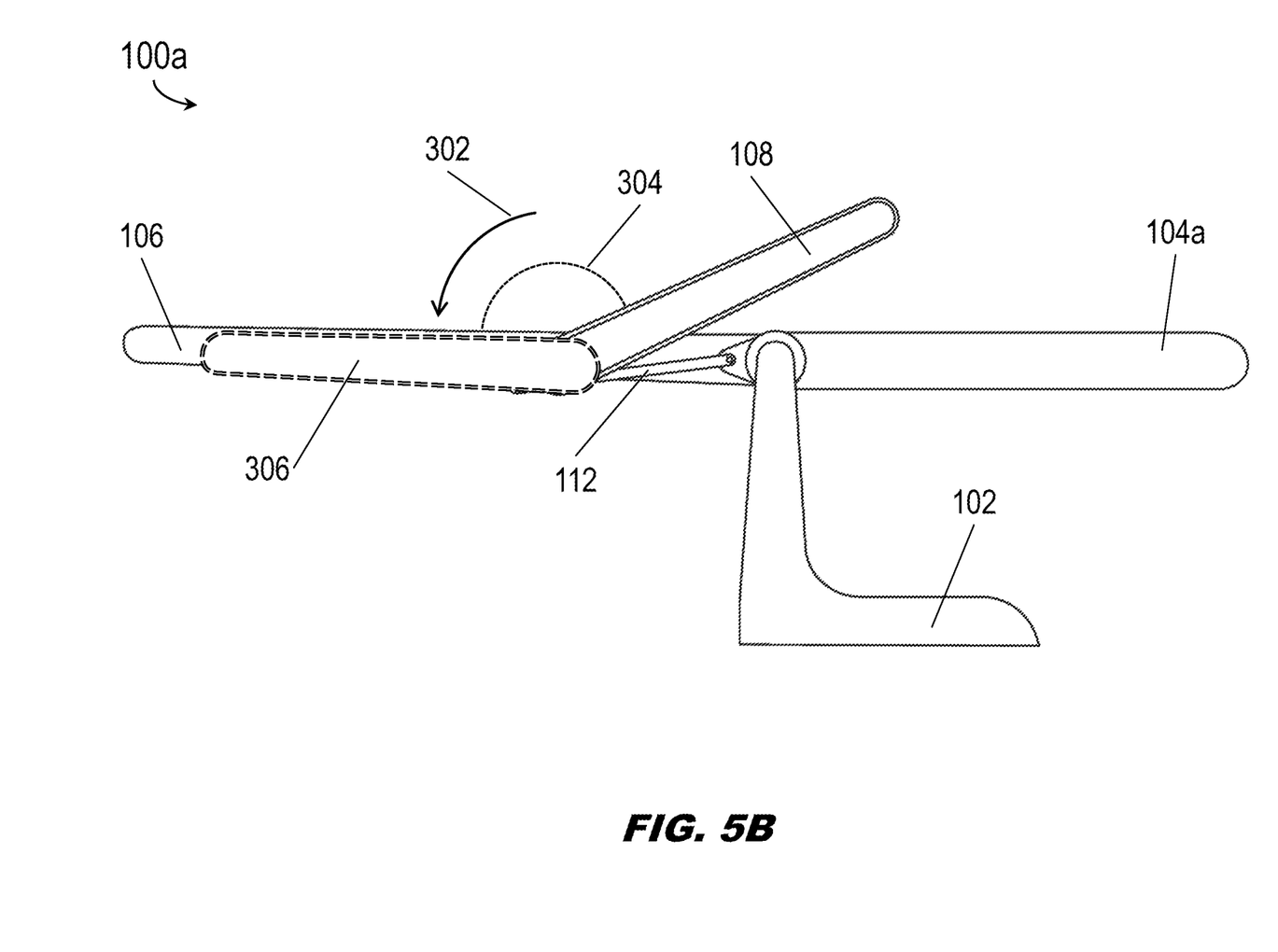
FIG. 5B is a right-side profile view of the passenger seat in a substantially fully reclined configuration.

Referring now to FIGS. 5A and 5B, the passenger seat 100a may be implemented and may function similarly to the passenger seat 100 of FIGS. 1 through 4E, except that the passenger seat 100 may incorporate a rear linkage 112 connecting the moving stop 110 to the seatpan 104a instead of the seat frame 102.

In embodiments, the seatpan 104a may be configured to pivot (500) relative to the seat frame 102 (e.g., relative to a lateral rotational axis 502) in addition to reclining. For example, the seatpan 104a may pivot independently of the reclining of the seatback 106, or the seatpan may collectively pivot with the seatback through at least a portion of the reclining of the seatback. For example, the armrests 108 may be similar to the armrests 108 as shown by FIGS. 4A through 4E above, in that the moving stops 110 and rear linkages 112 may maintain the armrests at a substantially parallel angle to the seatpan 104a. Similarly, the passenger seat 100a may be reclined past a point where the armrests 108 can no longer be maintained at the optimal ergonomic angle (e.g., substantially parallel) to the seatpan 104a. For example, the armrests 108 may be maintained at an alternative ergonomically optimal angle (304; e.g., maximum angle between the seatback and armrests) to the seatback 106 until the fully berthed configuration shown by FIG. 5B is reached. At any point, the armrests 108 may be rotated (302) away from the seatpan 104a into a berthed orientation (306) substantially flush or parallel with the reclined seatback 106.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A passenger seat incorporating a low-profile armrest articulation mechanism, comprising:
   a seat frame attachable to a cabin floor of a mobile platform;
   a seatpan coupled to the seat frame;
   a seatback pivotably coupled to the seat frame, the seatback configured for transitioning between an upright configuration and a berthed configuration, the berthed configuration substantially coplanar with the seatpan, the seatpan and the seatback collectively configured to support at least one passenger;

at least one moving stop pivotably coupled to the seatback at a left or right side;

an armrest pivotably coupled to each moving stop, the armrest not otherwise coupled to the seatpan or the seat frame; and at least one linkage pivotably connecting the seat frame to the at least one moving stop, the linkage and the moving stop collectively configured to maintain the armrest at a first optimal angle to the seatpan throughout at least a portion of the transitioning.

2. The passenger seat of claim 1, wherein the linkage and the moving stop are collectively configured to:

maintain the armrest at the first optimal angle to the seatpan throughout a first portion of the transitioning; and maintain the armrest at one or more second optimal angles to the seatback throughout a second portion of the transitioning.

3. The passenger seat of claim 1, wherein the first optimal angle corresponds to maintaining the armrest substantially parallel to the seatpan.

4. The passenger seat of claim 1, wherein:

the armrest comprises an upper surface and a lower surface opposite the upper surface;

the armrest is configured for rotation, when the seatback is in the berthed configuration, between an upright orientation associated with the upright configuration and a berthed orientation associated with the berthed configuration; and the lower surface is substantially coplanar with the seatback when in the berthed orientation.

5. A passenger seat incorporating a low-profile armrest articulation mechanism, comprising:

a seat frame attachable to a cabin floor of a mobile platform;

a seatpan and a seatback pivotably coupled to the seat frame, the seatpan configured to pivot relative to the seat frame according to a lateral pivoting axis, the seatback configured for transitioning between an upright configuration and at least one reclined configuration, the seatpan and the seatback collectively configured to support at least one passenger;

at least one moving stop pivotably coupled to the seatback at a left or right side;

an armrest pivotably coupled to each moving stop, the armrest not otherwise coupled to the seatpan or the seat frame; and at least one linkage pivotably connecting the seatpan to the at least one moving stop, the linkage and the moving stop collectively configured to maintain the armrest at a first optimal angle to the seatpan throughout at least a portion of the transitioning.

6. The passenger seat of claim 5, wherein the first optimal angle corresponds to maintaining the armrest substantially parallel to the seatpan.

7. The passenger seat of claim 5, wherein the linkage and the moving stop are collectively configured to:

maintain the armrest at the first optimal angle to the seatpan throughout a first phase of the transitioning; and maintain the armrest at one or more second optimal angles to the seatback throughout a second phase of the transitioning.

8. The passenger seat of claim 5, wherein the at least one reclined configuration includes a berthed configuration wherein the seatback is substantially coplanar with the seatpan.

9. The passenger seat of claim 8, wherein:

the armrest comprises an upper surface and a lower surface opposite the upper surface;

the armrest is configured for rotation, when the seatback is in the berthed configuration, between an upright orientation associated with the upright configuration and a berthed orientation associated with the berthed configuration; and the lower surface is substantially coplanar with the seatback when in the berthed orientation.

10. The passenger seat of claim 5, wherein the seatpan is configured to pivot with the transitioning of the seatback throughout at least a portion of the transitioning.

* * * * *